(12) United States Patent
Pozin et al.

(10) Patent No.: US 8,460,403 B2
(45) Date of Patent: Jun. 11, 2013

(54) METHOD OF STORING IRON DISULFIDE ($FeS_2$) PARTICLES

(75) Inventors: Michael Pozin, Brookfield, CT (US); Sean Chang, Cheshire, CT (US)

(73) Assignee: The Gillette Company, Boston, MA (US)

( * ) Notice: Subject to any disclaimer, the term of this patent is extended or adjusted under 35 U.S.C. 154(b) by 1081 days.

(21) Appl. No.: 11/982,509

(22) Filed: Nov. 2, 2007

(65) Prior Publication Data
US 2009/0070989 A1    Mar. 19, 2009

Related U.S. Application Data

(63) Continuation-in-part of application No. 11/901,214, filed on Sep. 14, 2007.

(51) Int. Cl.
*H01M 4/58*    (2010.01)

(52) U.S. Cl.
USPC ... 29/623.5; 29/623.1; 252/182.1; 429/218.1; 429/221

(58) Field of Classification Search
None
See application file for complete search history.

(56) References Cited

U.S. PATENT DOCUMENTS

| | | | |
|---|---|---|---|
| 3,996,069 A * | 12/1976 | Kronenberg | 429/328 |
| 4,952,330 A | 8/1990 | Leger | |
| 4,959,281 A | 9/1990 | Nishi | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,698,176 A | 12/1997 | Capparella | |
| 6,218,054 B1 | 4/2001 | Webber | |
| 6,849,360 B2 | 2/2005 | Marple | |
| 6,866,965 B2 | 3/2005 | Lee | |
| 7,157,185 B2 | 1/2007 | Marple | |
| 2002/0037457 A1 * | 3/2002 | Choi | 429/231.95 |
| 2003/0134196 A1 * | 7/2003 | Chen et al. | 429/213 |
| 2005/0084756 A1 * | 4/2005 | Marple | 429/221 |
| 2005/0233214 A1 * | 10/2005 | Marple et al. | 429/221 |
| 2005/0244706 A1 | 11/2005 | Wu | |
| 2005/0277023 A1 | 12/2005 | Marple | |
| 2006/0046152 A1 | 3/2006 | Webber | |
| 2006/0046153 A1 | 3/2006 | Webber | |
| 2006/0046154 A1 | 3/2006 | Webber | |
| 2006/0154147 A1 * | 7/2006 | Kurihara et al. | 429/231.8 |
| 2006/0228620 A1 | 10/2006 | Martinson | |

FOREIGN PATENT DOCUMENTS

| | | |
|---|---|---|
| CN | 1645651 A | 7/2005 |
| JP | 58 040773 | 3/1983 |
| JP | 59 091670 A | 5/1984 |
| JP | 59-112569 * | 6/1984 |
| JP | 2006-100164 | 4/2006 |
| WO | WO 2006/069011 A | 6/2006 |

* cited by examiner

*Primary Examiner* — Ula C Ruddock
*Assistant Examiner* — Tony Chuo
(74) *Attorney, Agent, or Firm* — Vladimir Vitenberg

(57) ABSTRACT

A primary cell having an anode comprising lithium and a cathode comprising iron disulfide ($FeS_2$) and carbon particles. The electrolyte comprises a lithium salt dissolved in a solvent mixture. Iron disulfide powder and carbon black is preferably premixed and stored. A cathode slurry is prepared comprising iron disulfide, carbon black, binder, and a liquid solvent. The mixture is coated onto a substrate and solvent evaporated leaving a dry cathode coating on the substrate. The cathode coating is then baked at elevated temperatures in atmosphere under partial vacuum or in an atmosphere of nitrogen or inert gas. The anode and cathode can be spirally wound with separator therebetween and inserted into the cell casing with electrolyte then added.

26 Claims, 4 Drawing Sheets

METHOD OF STORING IRON DISULFIDE (FES$_2$) PARTICLES

The claims 13-24 in the present application have common supporting subject matter satisfying 35 USC 112 in the present application and parent application Ser. No. 11/901,214, filed Sep. 14, 2007.

CROSS REFERENCE TO RELATED APPLICATIONS

This application is a continuation in part application of application Ser. No. 11/901,214, filed Sep. 14, 2007.

FIELD OF THE INVENTION

The invention relates to a method of preparing a cathode for a lithium primary cell having an anode comprising lithium metal or lithium alloy and a cathode comprising iron disulfide and an electrolyte comprising a lithium salt and solvents.

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate (LiCF$_3$SO$_3$) dissolved in a nonaqueous solvent. The cells are referenced in the art as primary lithium cells (primary Li/MnO$_2$ cells) and are generally not intended to be rechargeable. Alternative primary lithium cells with lithium metal anodes but having different cathodes, are also known. Such cells, for example, have cathodes comprising iron disulfide (FeS$_2$) and are designated Li/FeS$_2$ cells. The iron disulfide (FeS$_2$) is also known as pyrite. The Li/MnO$_2$ cells or Li/FeS$_2$ cells are typically in the form of cylindrical cells, typically AA size or AAA size cells, but may be in other size cylindrical cells. The Li/MnO$_2$ cells have a voltage of about 3.0 volts which is twice that of conventional Zn/MnO$_2$ alkaline cells and also have higher energy density (watt-hrs per cm$^3$ of cell volume) than that of alkaline cells. The Li/FeS$_2$ cells have a voltage (fresh) of between about 1.2 and 1.8 volts which is about the same as a conventional Zn/MnO$_2$ alkaline cell. However, the energy density (watt-hrs per cm$^3$ of cell volume) of the Li/FeS$_2$ cell is higher than a comparable size Zn/MnO$_2$ alkaline cell. The theoretical specific capacity of lithium metal is high at 3861.7 mAmp-hr/gram and the theoretical specific capacity of FeS$_2$ is 893.6 mAmp-hr/gram. The FeS$_2$ theoretical capacity is based on a 4 electron transfer from 4Li per FeS$_2$ molecule to result in reaction product of elemental iron Fe and 2Li$_2$S. That is, 2 of the 4 electrons change the oxidation state (valence) of +2 for Fe$^{+2}$ in FeS$_2$ to 0 in elemental iron (Fe$^0$) and the remaining 2 electrons change the oxidation state of sulfur from −1 in FeS$_2$ to −2 in Li$_2$S. In order to carry out the electrochemical reaction the lithium ions, Li$^+$, produced at the anode must transport through the separator and electrolyte medium and to the cathode.

Overall the Li/FeS$_2$ cell is much more powerful than the same size Zn/MnO$_2$ alkaline cell. That is for a given continuous current drain, particularly at higher current drain over 200 milliAmp, the voltage drops off much less quickly for the Li/FeS$_2$ cell than the Zn/MnO$_2$ alkaline cell as may be evident in a voltage vs. time profile. This results in a higher energy output obtainable from a Li/FeS$_2$ cell compared to that obtainable for a same size alkaline cell. The higher energy output of the Li/FeS$_2$ cell is also clearly shown more directly in graphical plots of energy (Watt-hrs) versus continuous discharge at constant power (Watts) wherein fresh cells are discharged to completion at fixed continuous power outputs ranging from as little as 0.01 Watt to 5 Watt. In such tests the power drain is maintained at a constant continuous power output selected between 0.01 Watt and 5 Watt. (As the cell's voltage drops during discharge the load resistance is gradually decreased raising the current drain to maintain a fixed constant power output.) The graphical plot Energy (Watt-Hrs) versus Power Output (Watt) for the Li/FeS$_2$ cell is above that for the same size alkaline cell. This is despite that the starting voltage of both cells (fresh) is about the same, namely, between about 1.2 and 1.8 volt.

Thus, the Li/FeS$_2$ cell has the advantage over same size alkaline cells, for example, AAA, AA, C or D size or any other size cell in that the Li/FeS$_2$ cell may be used interchangeably with the conventional Zn/MnO$_2$ alkaline cell and will have greater service life, particularly for higher power demands. Similarly the Li/FeS$_2$ cell which is a primary (nonrechargeable) cell can be used as a replacement for the same size rechargeable nickel metal hydride cell, which has about the same voltage (fresh) as the Li/FeS$_2$ cell.

The Li/MnO$_2$ cell and Li/FeS$_2$ cell both desirably employ non aqueous electrolytes, since the lithium anode is highly reactive with water. One of the difficulties associated with the manufacture of a Li/FeS$_2$ cell is the need to add good binding material to the cathode formulation to bind the Li/FeS$_2$ and carbon particles together in the cathode. The binding material must also be sufficiently adhesive to cause the cathode coating to adhere uniformly and strongly to the conductive substrate to which it is applied.

The cathode material may be initially prepared in a form such as a slurry mixture, which can be readily coated onto the metal substrate by conventional coating methods. The electrolyte added to the cell is a suitable nonaqueous electrolyte for the Li/FeS$_2$ system allowing the necessary electrochemical reactions to occur efficiently over the range of high power output desired. The electrolyte must exhibit good ionic conductivity and also be sufficiently stable, that is non reactive, with the undischarged or partially discharged electrode materials (anode and cathode components) and also non reactive with the discharge products. This is because undesirable oxidation/reduction reactions between the electrolyte and electrode materials (either discharged or undischarged or partially discharged) could gradually contaminate the electrolyte and reduce its effectiveness or result in excessive gassing. This in turn can result in a cell failure. Thus, the electrolyte used in a Li/FeS$_2$ cell in addition to promoting the necessary electrochemical reactions, should also be stable in contact with discharged, partially discharged and undischarged electrode materials. Additionally, the electrolyte should enable good ionic mobility and transport of the lithium ion (Li$^+$) from anode to cathode so that it can engage in the necessary reduction reaction resulting in Li$_2$S product in the cathode.

Primary lithium cells are in use as a power source for digital flash cameras, which require operation at higher pulsed power demands than is supplied by individual alkaline cells. Primary lithium cells are conventionally formed of an electrode composite comprising an anode formed of a sheet of lithium (or lithium alloy, essentially of lithium), a cathode formed of a coating of cathode active material comprising FeS$_2$ on a conductive metal substrate (cathode substrate) and a sheet of electrolyte permeable separator material therebetween. The electrode composite may be spirally wound and inserted into the cell casing, for examples, as shown in U.S. Pat. No. 4,707,421.

A cathode coating mixture for the Li/FeS$_2$ cell is described in U.S. Pat. No. 6,849,360 B2 and U.S. Pat. No. 7,157,185 B2. The cathode described in these two references includes FeS$_2$ particles, carbon particles (acetylene black and graphite), fumed silica, and a polymer binder preferably a styrene-ethylene/butylene-styrene (SEBS) block copolymer. Such binder is described as available as Kraton G1651 from Kraton Polymers, Houston Tex. These latter references describe that the cathode components are first made into a wet cathode slurry by adding solvent such as 1,1,2-trichloroethylene. The wet slurry is then applied to both sides of a carrier sheet, namely, a continuous aluminum strip, to form the wet cathode. It is implied that the wet cathode is then dried, since the phrase "after drying" appears (U.S. Pat. No. 6,849,360 at col. 6, line 3 and U.S. Pat. No. 7,157,185 at col. 6, line 33). There is no discussion in these two references of any specific manner in which the drying of the wet cathode is carried out. The references do not mention, nor are they concerned with, any particular drying method, drying atmosphere, or heating sequence and temperatures required to carry out the drying of the wet cathode. In fact there is no indication that any particular method of drying of the wet cathode or subsequent heat treatment of the dried cathode would be desirable or lead to better results.

A portion of the spiral wound anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The anode in a Li/FeS$_2$ cell can be formed by laminating a layer of lithium metal or lithium alloy on a metallic substrate such as copper. However, the anode may be formed of a sheet of lithium or lithium alloy without any substrate.

The electrolyte used in primary Li/FeS$_2$ cells are formed of a "lithium salt" dissolved in an "organic solvent". The electrolyte must promote ionization of the lithium salt and provide for good ionic mobility of the lithium ions so that the lithium ions may pass at good transport rate from anode to cathode through the separator. Representative lithium salts which may be used in electrolytes for Li/FeS$_2$ primary cells are referenced in U.S. Pat. No. 5,290,414 and U.S. Pat. No. 6,849,360 B2 and include such salts as: Lithium trifluoromethanesulfonate, LiCF$_3$SO$_3$ (LiTFS); lithium bistrifluoromethylsulfonyl imide, Li(CF$_3$SO$_2$)$_2$N(LiTFSI); lithium iodide, LiI; lithium bromide, LiBr; lithium tetrafluoroborate, LiBF$_4$; lithium hexafluorophosphate, LiPF$_6$; lithium hexafluoroarsenate, LiAsF$_6$; Li(CF$_3$SO$_2$)$_3$C; LiClO$_4$; lithium bis(oxalato)borate, LiBOB and various mixtures. In the art of Li/FeS$_2$ electrochemistry lithium salts are not always interchangeable as specific salts work best with specific electrolyte solvent mixtures.

In U.S. Pat. No. 5,290,414 (Marple) is reported use of a beneficial electrolyte for FeS$_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimetoxyethane (DME). As given in the example the 1,2-dimethoxyethane (DME) is present in the electrolyte in substantial amount, i.e., at either 40 or 75 vol. % (col. 7, lines 47-54). A specific lithium salt ionizable in such solvent mixture(s), as given in the example, is lithium trifluoromethane sulfonate, LiCF$_3$SO$_3$. Another lithium salt, namely lithium bistrifluoromethylsulfonyl imide, Li(CF$_3$SO$_2$)$_2$N is also mentioned at col. 7, line 18-19. The reference teaches that a third solvent may optionally be added selected from 3,5-dimethlyisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19) with the preferred being 3,5-dimethylisoxazole.

In U.S. Pat. No. 6,849,360 B2 (Marple) is disclosed a specific preferred electrolyte for an Li/FeS$_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48) The electrolyte is typically added to the cell after the dry anode/cathode spiral with separator therebetween is inserted into the cell casing.

Contaminants can be introduced into the cell, from different sources, in particular, from the storage of FeS$_2$ powder prior to its use in the cathode mix. It is stated: "Decomposition products resulting from the reaction of FeS$_2$ with moisture are acidic in nature, and their introduction into the cell containing lithium is undesirable." Jean-Paul Gabano (Ed.), Lithium Batteries, Academic Press (1983), p. 117 bottom. The stored FeS$_2$ powder as well as cathodes based on FeS$_2$ can gradually react with atmospheric air and moisture resulting in acidic and other byproducts, some capable of forming dendrites, which can all reduce cell life and can interfere with attainment of good cell performance during normal usage. For example, the dendrites can cause internal short circuiting of the cell and the acidic components may react with cell components such as the metallic current collectors. The acidic components may also induce polymerization of the electrolyte solvents. In published patent application US 2005/0277023 A1 (Marple) it is disclosed that a pH raising additive compound may be added to the FeS$_2$ powder to counteract the acidic components. The reference indicates that adding a pH raising additive to the FeS$_2$ can prevent or substantially prevent internal short circuits by reducing dendrite formation. (US 2005/0277023 A1, paragraph 90) Such pH raising additives recited in this reference include calcium oxide (CaO), calcium stearate, calcium hydroxide (Ca(OH)$_2$), magnesium oxide (MgO), strontium oxide (SrO), and barium oxide (BaO). Overbased calcium sulfonates have a calcium carbonate (CaCO$_3$) portion linked to the calcium sulfonate molecule. The carbonate portion is reported in the reference as responsible for raising the pH of the FeS$_2$. Other pH raising additives for admixture with FeS$_2$ or FeS$_2$ cathodes disclosed in US 2005/0277023 A1 are organic amines such as diethylamine and triethylamine, cycloaliphatic epoxies such as butylenes oxide and soybean oil epoxide, and amino alcohols such as 2-amino-2-methyl-1-propanol.

Conventional FeS$_2$ powders, for example Pyrox Red 325 powder from Chemetall GmbH, are commercially available with pH raising additives therein. (However, FeS$_2$ powder can also be ordered without any pH raising additives.) Such additives are believed to contain calcium carbonate (CaCO$_3$) or calcium carbonate linked to other compounds. Such calcium carbonate is added to the FeS$_2$ powder to retard the formation of acidic impurities within or on the surface of the powder as it is stored in ambient air and exposed to oxygen and moisture present in air. Thus the calcium carbonate is conventionally added in this manner to reduce the buildup of acidic contaminants in the FeS$_2$ powder. This is regardless of whether the $FeS_2$ is intended for use in cathode mixtures or other applications, for example, as an additive in manufacture of car brakes.

The addition of pH raising additive such as calcium carbonate ($CaCO_3$) or calcium carbonate containing compounds to the $FeS_2$ powder, however, tends to cause agglomeration of the $FeS_2$ particles when the $FeS_2$ powder is stored in ambient air. Such agglomeration of the $FeS_2$ powder can significantly interfere with attainment of the expected level of performance from Li/$FeS_2$ cells. Also, the calcium carbonate or calcium carbonate containing compound additives has the disadvantage that such compounds get carried into the $FeS_2$ cathode mixture. The calcium carbonate acts merely as an insulator within the cathode, that is, it is not electrochemically active and does not render the cathode more conductive. In other words the calcium carbonate takes up a certain amount of volume within the cathode that might otherwise be used for $FeS_2$ active material. If calcium carbonate is admixed with $FeS_2$ to raise pH it may typically comprise about 1.5 percent by weight of the mixture. However, calcium carbonate is less dense than $FeS_2$. The bulk density ratio of $FeS_2$ to $CaCO_3$ is about 1.66. That is, 1.5 grams of calcium carbonate has the same volume as 2.49 grams $FeS_2$. Thus for every 1.5 grams of calcium carbonate present in the cathode there are 2.49 grams less $FeS_2$ active material that can be included in the cathode.

Accordingly, it is desired to reduce the rate of buildup of acidic contaminants in the $FeS_2$ powder and thus in effect to extend the storage life of the $FeS_2$ without sacrificing electrochemical cathode capacity. It is desired to reduce or eliminate altogether the amount of pH raising additive, such as calcium carbonate, that acts merely as an insulator and takes up volume within the cathode, which could otherwise be used for additional $FeS_2$ active material.

Accordingly, it is desired to improve the storage life of $FeS_2$ powder by adding to the powder a material other than calcium carbonate or other pH raising additive to retard buildup of acidic contaminants, wherein the new material unlike the calcium carbonate, is not merely and insulator within the cathode but also serves to improve electrochemical capacity or conductivity.

It is also desired to improve the method of forming the cathode for the Li/$FeS_2$ cell, in particular to reduce the amount of acidic contaminants carried into the cell by the $FeS_2$ powder.

It is desired that the method of treatment of the cathode reduces the amount of acidic contaminants therein before the cathode is inserted into the cell casing. It is desired that the treatment be such that it reduces the chance of the contaminants reoccurring.

It is desired to produce a primary (nonrechargeable) Li/$FeS_2$ cell having good rate capability that the cell may be used in place of rechargeable batteries to power digital cameras.

SUMMARY OF THE INVENTION

The invention is directed to lithium primary cells wherein the anode comprises lithium metal. The lithium metal may be alloyed with small amounts of other metal, for example aluminum, or calcium which typically comprises less than about 1 or 2 wt. %, and even up to about 5 wt. % of the lithium alloy. Thus, the term "lithium" or "lithium metal" as used herein shall be understood to include such lithium alloy. The lithium which forms the anode active material, is preferably in the form of a thin foil. The cell has a cathode comprising the cathode active material iron disulfide ($FeS_2$), commonly known as "pyrite". Desirably, the cell may be cylindrical, comprising a spirally wound electrode assembly therein. The electrode assembly is formed of an anode sheet and a cathode composite sheet spirally wound with separator therebetween. The cathode composite sheet is formed by coating a cathode slurry mixture comprising iron disulfide ($FeS_2$) particles onto a substrate, preferably a conductive metal substrate. The cathode slurry coating on the conductive substrate is then predried to evaporate the solvents therein to form a dry cathode composite sheet (dried cathode coating on the substrate), which is calendered to compact the coating. The calendered cathode composite is then subjected to baking in accordance with an aspect of the invention. The electrode spiral comprising anode sheet, baked cathode composite sheet with separator therebetween is formed and inserted into the cell casing and electrolyte then added.

Prior to forming the cathode it has been determined that the storage life of the $FeS_2$ powder can be extended by admixing $FeS_2$ powder with carbon black, preferably acetylene black powder. (The term carbon black as used herein includes acetylene black as made from the incomplete combustion or thermal decomposition of acetylene. The term carbon black as used herein also includes carbon black made from the incomplete combustion or thermal decomposition of natural gas or petroleum oil.) Acetylene black powder, for example, Super P carbon black from Timcal, Ltd. has an elevated pH of about 10 as measured by ASTM D1512-95. Unless otherwise specified the term pH as used herein and in the claims shall be the pH as measured by ASTM D-1512 method. Such carbon black is desirably added to the $FeS_2$ cathode mixture in amount between about 0.4 and 2 wt. % of the dry cathode and even higher amounts. (The dry $FeS_2$ cathode may typically comprise between about 3.6 to 6 wt. % graphite so that the total carbon black and graphite content is typically between about 4 and 8 wt % of the dry cathode.) If the $FeS_2$ powder is premixed with the same amount (wt. %) of carbon black that is needed in the dry cathode then additional carbon black need not be added when forming the cathode.

It is desired to premix the carbon black, preferably acetylene black, with the $FeS_2$ powder as soon as possible after the $FeS_2$ powder has been prepared. It is thus convenient to have the supplier premix the $FeS_2$ powder with the carbon black. Thus the $FeS_2$ powder may be received from the supplier with the desired amount of carbon black needed in the cathode already premixed into the FeS2 powder. Graphite, which may also be in the final cathode mixture, may optionally also be premixed into the $FeS_2$ powder along with the addition of carbon black or may be added at a later time.

It has been determined that premixing the $FeS_2$ powder in this manner with the required amount of carbon black (e.g. same weight percent) needed in the cathode serves to retard the rate of buildup of acidic contaminants on the surface of the $FeS_2$ particles during storage of the $FeS_2$ powder. Carbon black, such as acetylene black, commonly has an elevated pH above about 6, typically between about 6 and 11. The elevated pH of the carbon black is the result of the thermal processes involving thermal decomposition or incomplete combustion of acetylene, natural gas or petroleum oil used in the manufacture of carbon black. The elevated pH of the carbon black, e.g. Super P acetylene carbon black having pH of 10 serves to increase the pH of the $FeS_2$ powder and thus retard the formation of acidic contaminants even though the $FeS_2$ and carbon black mixture is stored in ambient air. The carbon black appears to cover much of the $FeS_2$ surface thus reducing the amount of $FeS_2$ surface area exposed to the ambient atmosphere. This provides a degree of added protection for the $FeS_2$ particles from contamination because of exposure to the ambient air. The carbon black also does not cause agglomeration of the FeS$_2$ particles when the mixture of FeS2 powder and carbon black is placed in storage in ambient air.

The premixture of FeS$_2$ powder and carbon black may be further protected by storing the mixture in sealed aluminum foil bags or containers filled with nitrogen or other inert gas (e.g. helium, argon, neon or krypton) therein or in air under partial vacuum conditions until ready for use in forming the cathode mixture. The FeS$_2$ and carbon black mixture can also be subjected to heat treatment, if desired just prior to forming the cathode, in order to further remove any residual acidic contaminants.

The cathode is formed of a cathode slurry comprising iron disulfide (FeS$_2$) powder, conductive carbon particles, binder material, and solvent. (The term "slurry" as used herein will have its ordinary dictionary meaning and thus be understood to mean a wet mixture comprising solid particles.) The FeS$_2$ particles are bound to the conductive substrate using a polymeric binder, desirably an elastomeric polymeric binder, preferably, a styrene-ethylene/butylene-styrene (SEBS) block copolymer such as Kraton G1651 elastomer (Kraton Polymers, Houston, Tex.). This polymer is a film-former, and possesses good affinity and cohesive properties for the FeS$_2$ particles as well as for conductive carbon particle additives in the cathode mixture. The polymer is stable and nonreactive with the electrolyte and cell components. The wet cathode slurry is coated onto a substrate, preferably a conductive substrate such as a sheet of aluminum or stainless steel forming a cathode composite sheet. The conductive substrate functions as a cathode current collector. The solvent is then evaporated leaving a dry cathode coating comprising the iron disulfide material, carbon particles, and binder material, adhesively bound to each other within the dry cathode coating on the conductive substrate. The carbon particles provide a network of electrical pathways connecting the iron disulfide particles. The carbon particles preferably comprise carbon black. The preferred carbon black is acetylene black. The carbon may optionally include graphite particles blended therein.

A principal aspect of the invention is directed to reducing the rate of buildup of acidic contaminants within FeS$_2$ powder as the powder is stored prior to use in forming cathodes for Li/FeS$_2$ cells.

A principal aspect of the invention is directed to an improved method for forming the cathode composite, that is, the cathode coating comprising iron disulfide (FeS$_2$), carbon, and binder material coated onto a conductive substrate. The method of the invention has the advantage of significantly reducing, if not eliminating, the amount of contaminants that may be present in the iron disulfide (FeS2) particles and cathode coating on the conductive substrate, prior to forming the wound electrode assembly for insertion into the cell casing.

The iron disulfide is purchased in the form of a powder. It has exposure to atmospheric air and moisture during transit and storage. This results in contaminants, which include mostly acids and Fe containing salts, forming on the surfaces and within the pores of the FeS$_2$ particles. The contaminants include acids and Fe containing salts such as FeS, H$_2$S, H$_2$SO$_4$, H$_2$SO$_3$, FeSO$_4$, FeSO$_4$.nH$_2$O (hydrate). If these contaminants are present in the cathode, they can react directly with electrolyte or cell components to significantly interfere with proper performance of the cell. It has been determined that if the FeS$_2$ particles are heat treated in a nitrogen atmosphere prior to their use in the cathode mixture, the level of contaminants can be reduced. But it has been found that the contaminants can gradually reform and reappear on the FeS$_2$ surfaces when the heat treated particles are subsequently placed in storage with exposure to atmospheric air and moisture. In a cell assembly operation it is not practical to heat treat the FeS$_2$ particles and use the heat treated FeS$_2$ particles immediately in forming the cathode slurry without exposing them to atmospheric air and moisture prior to forming the slurry.

In accordance with the method of the invention a solution to this problem has been developed so that there is no longer a need to preheat the FeS$_2$ powder to remove contaminants therein prior to forming the wet cathode slurry. When prepared by the method of the invention, the cathode comprising FeS$_2$ particles has the contaminant content substantially reduced at the time the cathode is inserted into the cell casing. The electrolyte, which is nonaqueous, is added to the cell as soon as possible after the cathode is inserted into the cell. The electrolyte prevents exposure of the FeS$_2$ particles to air and moisture, in turn preventing formation of the contaminants on the FeS$_2$ surface.

In a principal aspect of the invention it has been determined that FeS$_2$ powder can be premixed with the same amount (wt. %) of carbon black, preferably acetylene black, as desired for the final dry cathode. It has been determined that the acetylene black raises the pH of the FeS$_2$ powder or prevents the FeS$_2$ from becoming more acidic as it is left in storage, even if the FeS$_2$ powder is stored in ambient air. The elevation of pH in the FeS$_2$ powder as a result of the acetylene black additive therein reduces the rate of buildup of the acidic contaminants on the surface of the FeS$_2$ particles and thus extends the useful storage life of the FeS$_2$ powder until needed to form a complete cathode mixture.

In the method of the invention the FeS$_2$ particles do not have to be pretreated by subjecting them to preheating in order to remove contaminants prior to formation of the wet cathode slurry. However, such pretreatment of the FeS$_2$ may optionally be included. The cathode may be formed by the method of the invention as follows:

a) Obtain FeS$_2$ powder preferably without any pH raising additives therein and add carbon black, desirably acetylene black to the FeS$_2$ powder. A preferred acetylene black is Super P acetylene black from Timcal America, which has a pH of 10. Alternatively, the FeS$_2$ powder may be obtained from the supplier with the acetylene black already premixed therein. The FeS$_2$ powder preferably does not have other pH raising additives, that is, other than the carbon black mixed therein. (Or reduced amount of other pH raising additive). The mixture comprising FeS$_2$ powder and carbon black is stored as a dry or substantially dry mixture for a period of at least about 30 days.

a.1) Prepare a mixture of said FeS$_2$ powder and carbon black, preferably acetylene carbon black such as acetylene black Super P from Timcal desirably in the same weight ratio compared to FeS$_2$ or in amount equal to the same weight percent as intended for dry cathode coating 60 on substrate 65. Store the mixture of said FeS$_2$ powder and acetylene black in air at ambient temperature until desired to prepare a cathode slurry. Optionally graphite may be premixed into the FeS$_2$ powder and acetylene black before the mixture is stored. Preferably, store the mixture of said FeS$_2$ powder and acetylene black (with or without graphite included) in a sealed aluminum foil bag or container in an atmosphere of air under partial vacuum conditions or in an inert atmosphere of nitrogen, helium, argon, neon, or krypton, or mixtures thereof until ready for use in preparing the cathode slurry.

a.2) Form a cathode slurry comprising FeS$_2$ particles, carbon particles, binder, and binder solvent, preferably by adding graphite (Timrex KS6 from Timcal), and elastomeric binder Kraton G1651 dissolved in binder solvent to the mixture of FeS₂ powder and carbon black b) apply the cathode slurry to a side of a conductive substrate; c) dry the cathode slurry, for example, in a convective air oven or the like, to form a dry or substantially dry cathode coating on the substrate; d) optionally, apply the cathode slurry also to the opposite side of the conductive substrate and if so then step (c) is repeated; and e) calender the dried cathode coating to compress its thickness on the substrate. Applicant has determined if the dried cathode coating is then subjected to the additional step of f) baking the dried cathode coating on the conductive substrate in a partial vacuum air pressure, the acid contaminant content in the dry cathode coating is reduced. (The term "partial vacuum pressure" as used herein shall be understood to mean below atmospheric pressure. The term "substantially dry coating" as used herein shall mean a coating that is a solid mass which is dry or moist to finger touch.)

Alternatively, the atmosphere in the baking step (f) may be an atmosphere of nitrogen (not limited to pressure) or an inert atmosphere of helium, argon, neon, or krypton or mixtures thereof. If the atmosphere is air, then it is desirable that the pressure be a partial vacuum, namely, air of pressure less than about 80 mm Hg (absolute), preferably at pressure less than about 50 mm Hg (absolute). The cathode coating on the conductive substrate is desirably baked in step (f) in any of the above indicated atmospheres at elevated temperatures between about 250° C. and 375° C., preferably between about 290° C. and 350° C. for a period between about 2 and 24 hours. Such baking may be extended for up to about 3 to 4 days. In order for the acidic contaminants not to substantially reoccur the cathode coating on the substrate is baked in step (f) forming a baked cathode. This is followed in a short time (after the baked cathode has cooled) by forming the wound electrode assembly (which includes the baked cathode, anode sheet and separator therebetween) and inserting the electrode assembly into the cell casing. Electrolyte is then added to the cell as soon as possible thereafter, preferably in less than about 24 hours. The baked cathode or wound electrode assembly can be stored for a period in sealed foil bags with nitrogen or other inert gas therein or in air or other atmosphere under partial vacuum conditions prior to insertion into the cell casing. Alternatively, the wound electrode assembly prior to or after insertion into the cell casing, may be stored in a dry room atmosphere having low relative humidity for a period up to about 24 hours. Electrolyte is then added to the cell covering the cathode with electrolyte.

It has been determined that baking of the cathode coating on the conductive substrate in the above indicated atmospheres allows use of the above elevated baking temperatures without causing deterioration in the physiochemical properties of the Kraton binder. These higher baking temperatures (between 250° C. and 375° C., preferably between about 290° C. and 350° C.) are preferred, since they result in easier removal of the contaminants from the FeS₂ particles within the cathode coating.

Although a preferred, representative electrolyte is given herein by way of example for the Li/FeS₂ cell, the advantage of the method of the invention for preparation of the FeS₂ cathode is not intended to be limited by any particular electrolyte for the Li/FeS₂ cell. The method of the invention for preparation of the FeS₂ cathode is thus generally believed to be useful and have advantage independent of the electrolyte employed in the cell.

DETAILED DESCRIPTION

Figure 1:
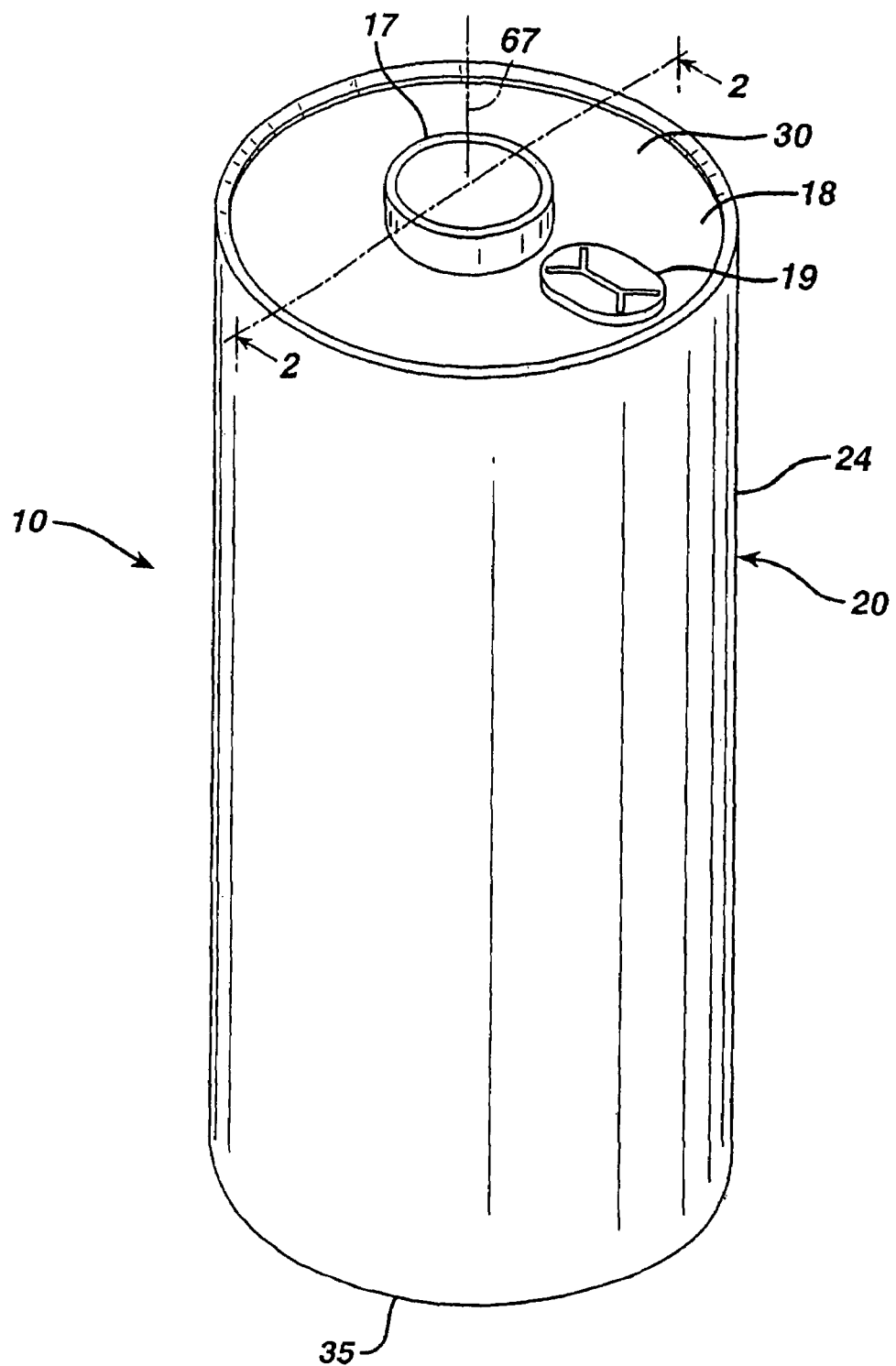
FIG. 1 is an isometric view of an improved Li/FeS₂ cell of the invention as presented in a cylindrical cell embodiment.

The Li/FeS₂ cell of the invention is desirably in the form of a spirally wound cell as shown in FIGS. 1-5. A desirable wound cell 10 configuration comprising a lithium anode 40 and a cathode composite 62 comprising iron disulfide (FeS₂) with separator sheet 50 therebetween is shown in the figures. The anode may comprise a sheet of lithium or lithium alloy 40. The cathode composite may comprise a coating of cathode material 60 comprising iron disulfide (FeS₂) which is coated on at least one side of a substrate 65 as shown best in FIGS. 4 and 5. The cathode material 60 may also be coated on both sides of substrate 65. The substrate or grid 65 is preferably an electrically conductive substrate, such as a sheet of aluminum, or stainless steel foil. The conductive substrate 65 may be a continuous solid sheet without apertures or may be a sheet with apertures therein, for example, formed from expanded stainless steel foil or expanded aluminum foil.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum or lithium and calcium. In such case the alloy metal, is present in very small quantity, preferably less than 1 or 2 percent by weight of the lithium alloy. Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm desirably between about 0.12 and 0.19 mm, preferably about 0.15 mm for the spirally wound cell.

The Li/FeS₂ cell as in cell 100 has the following basic discharge reactions (one step mechanism):

Anode:

$$4Li = 4Li^+ + 4e \qquad \text{Eq. 1}$$

Cathode:

$$FeS_2 + 4Li^+ + 4e = Fe + 2Li_2S \qquad \text{Eq. 2}$$

Overall:

$$FeS_2 + 4Li = Fe + 2Li_2S \qquad \text{Eq. 3}$$

The Li/FeS₂ cylindrical cell 10 may be in the form of a primary (nonrechargeable) cell.

The cathode material 60 of the invention comprising iron disulfide (FeS₂) or any mixture including iron disulfide (FeS₂) as active cathode material, may thus be coated onto one or both sides of conductive substrate 65 to form cathode composite sheet 62. The cathode active material, that is, the material undergoing useful electrochemical reaction, in cathode 60 can be composed entirely of iron disulfide (FeS₂) or may include another coactive material. The cathode 60 comprising iron disulfide ($FeS_2$) powder dispersed therein can be prepared in the form of a wet slurry comprising a mixture of iron disulfide powder, carbon particles, polymeric binder and solvents mixed therein. The wet slurry is coated on one side of the conductive metal foil 65, preferably an aluminum or stainless steel foil as above indicated. The wet coating 60 on substrate 65 may then be dried in a conventional convective air oven to evaporate the solvents. Then a coating of the wet slurry may optionally also be applied to the opposite side (not shown) of conductive substrate 65. In such case the wet coating on the opposite side of conductive substrate 65 is similarly dried in a convective air oven to evaporate solvents. A cathode composite sheet 62 is formed with dry cathode coating 60 on one or both sides of conductive substrate 65. The cathode composite sheet 62 can then be subjected to calendering resulting in a compacted smooth dry cathode coating 60 on conductive substrate 65.

The cathode slurry comprises 2 to 4 wt % of binder (Kraton G1651 elastomeric binder from Kraton Polymers, Houston Tex.); 50 to 70 wt % of active $FeS_2$ powder; 4 to 7 wt % of conductive carbon (carbon black and graphite); and 25 to 40 wt % of solvent(s). (The carbon black is preferably acetylene carbon black. However, the carbon black may include in whole or in part other carbon black, such as carbon black made from the incomplete combustion or thermal decomposition of natural gas or petroleum oil. Thus, the term carbon black as used herein shall be understood to extend to and include acetylene black and such other carbon black.) The Kraton G1651 binder is a polymeric elastomeric block copolymer (styrene-ethylene/butylene (SEBS) block copolymer) which is a film-former. The Kraton polymeric binder is soluble in the solvents employed in forming the wet cathode slurry. Kraton binder has excellent film forming properties and readily disperses over the iron disulfide particles and conductive carbon particles to help keep these particles in contact with each other. That is, the binder possesses sufficient affinity for the active $FeS_2$ and carbon black particles to facilitate preparation of the wet cathode slurry and to keep these particles in contact with each other in a network after the solvents are evaporated. The Kraton binder is also stable in the electrolyte which is subsequently added to cell after the anode 40, cathode 62 with separator 50 therebetween are wound and inserted into the cell casing. The Kraton binder is chemically and electrochemically resistant so that it does not react with the electrolyte or other cell contents during cell storage or discharge, even over a wide range of environmental conditions between about −10° C. and 60° C.

The $FeS_2$ powder may have an average particle size between about 1 and 100 micron, desirably between about 10 and 50 micron and a BET surface typically between about 0.8 and 1.5 $m^2/g$. A desirable $FeS_2$ powder is available under the trade designation Pyrox Red 325 powder from Chemetall GmbH, wherein the $FeS_2$ powder has a particle size sufficiently small that of particles will pass through a sieve of Tyler mesh size 325 (sieve openings of 0.045 mm). (The residue amount of $FeS_2$ particles not passing through the 325 mesh sieve is 10% max.) The Pyrox Red 325 $FeS_2$ had an average particle size of between about 20 and 26 micron and a typical BET surface of about 1.1 $m^2/g$ and density of 4.7 $gm/cm^3$. The graphite is available under the trade designation TIMREX KS6 graphite from Timcal America. TIMREX graphite is a fairly high crystalline synthetic graphite, BET surface 20 $m^2/g$, density 2.25 $g/cm^3$. (Other graphites may be employed selected from natural, synthetic, or expanded graphite and mixtures thereof, but the TIMREX graphite from Timcal is preferred because of its high purity.) The carbon black is preferably an acetylene black available under the trade designation Super P conductive carbon black (BET surface of 62 $m^2/g$, bulk density in bag 0.160 $g/cm^3$) from Timcal Co. Super P acetylene black has a pH of about 10 as measured by ASTM D1512-95. Other suitable carbon blacks are available from Timcal Co. under the trade designations ENSACO Granular, ENSACO P, SUPER S, SUPER S—Li, and SUPER P—Li. These latter carbon blacks have a pH of between about 6 and 11 as measured by ASTM-D1512 or the equivalent International Standard Ref. No. ISO 787/9-1981 (E).

Solvents are mixed into the $FeS_2$ powder, carbon particles, and polymeric binder to form a wet cathode slurry. In a preferred mixing sequence solvents are mixed first with binder to form a binder/solvent mixture. $FeS_2$ and carbon particles may be separately premixed and then added to the binder/solvent mixture. The solvents preferably include a mixture of $C_9$-$C_{11}$ (predominately $C_9$) aromatic hydrocarbons available as ShellSol A100 hydrocarbon solvent (Shell Chemical Co.) and a mixture of primarily isoparaffins (average M.W. 166, aromatic content less than 0.25 wt. %) available as Shell Sol OMS hydrocarbon solvent (Shell Chemical Co.). The weight ratio of ShellSol A100 to ShellSol OMS solvent is desirably at a 4:6 weight ratio. The ShellSol A100 solvent is a hydrocarbon mixture containing mostly aromatic hydrocarbons (over 90 wt % aromatic hydrocarbon), primarily $C_9$ to $C_{11}$ aromatic hydrocarbons. The ShellSol OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders ($FeS_2$ powder and carbon particles) are first blended to ensure uniformity before being added to the Kraton G1651 binder solution in the mixing bowl. The solvents are then added and the components blended in the mixer and until a homogeneous slurry mixture is obtained.

A preferred cathode wet slurry mixture by way of non limiting example is presented in Table 1:

TABLE I

| Cathode Slurry | |
|---|---|
| | Wet Slurry (wt. %) |
| Binder (Kraton G1651) | 2.0 |
| Hydrocarbon Solvent (ShellSol A100) | 13.4 |
| (ShellSol OMS) | 20.2 |
| $FeS_2$ Powder (Pyrox Red 325) | 58.9 |
| Graphite (Timrex KS6) | 4.0 |
| Acetylene Carbon Black (Super P) | 1.5 |
| Total | 100.0 |

This same or similar wet cathode slurry mixture (electrolyte not yet added to the cell) is disclosed in commonly assigned application Ser. No. 11/516,534, filed Sep. 6, 2006. The total solids content of the wet cathode slurry mixture as shown in above Table 1 is 66.4 wt. %. Thus, the acetylene black content in the dry cathode would be 2.26 wt. % and the graphite content in the dry cathode would be 6.02 wt. %.

The cylindrical cell 10 may have a spirally wound electrode assembly 70 (FIG. 3) comprising anode sheet 40, cathode composite 62 with separator sheet 50 therebetween as shown in FIGS. 2-5. The Li/$FeS_2$ cell 10 internal configuration, apart from the difference in cathode composition, may be similar to the spirally wound configuration shown and described in U.S. Pat. No. 6,443,999. The anode sheet 40 as shown in the figures comprises lithium metal and the cathode sheet 60 comprises iron disulfide ($FeS_2$) commonly known as "pyrite". The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔ A cell (35×15 mm) or other cylindrical size. However, it is not intended to limit the cell configuration to cylindrical shape. Alternatively, the cell of the invention may have a spirally wound electrode assembly formed of an anode comprising lithium metal and a cathode comprising iron disulfide ($FeS_2$) made as herein described inserted within a prismatic casing, for example, a rectangular cell having the overall shape of a cuboid. The $Li/FeS_2$ cell is not limited to a spirally wound configuration but the anode and cathode, for example, may be placed in stacked arrangement for use in coin cells.

Figure 3:
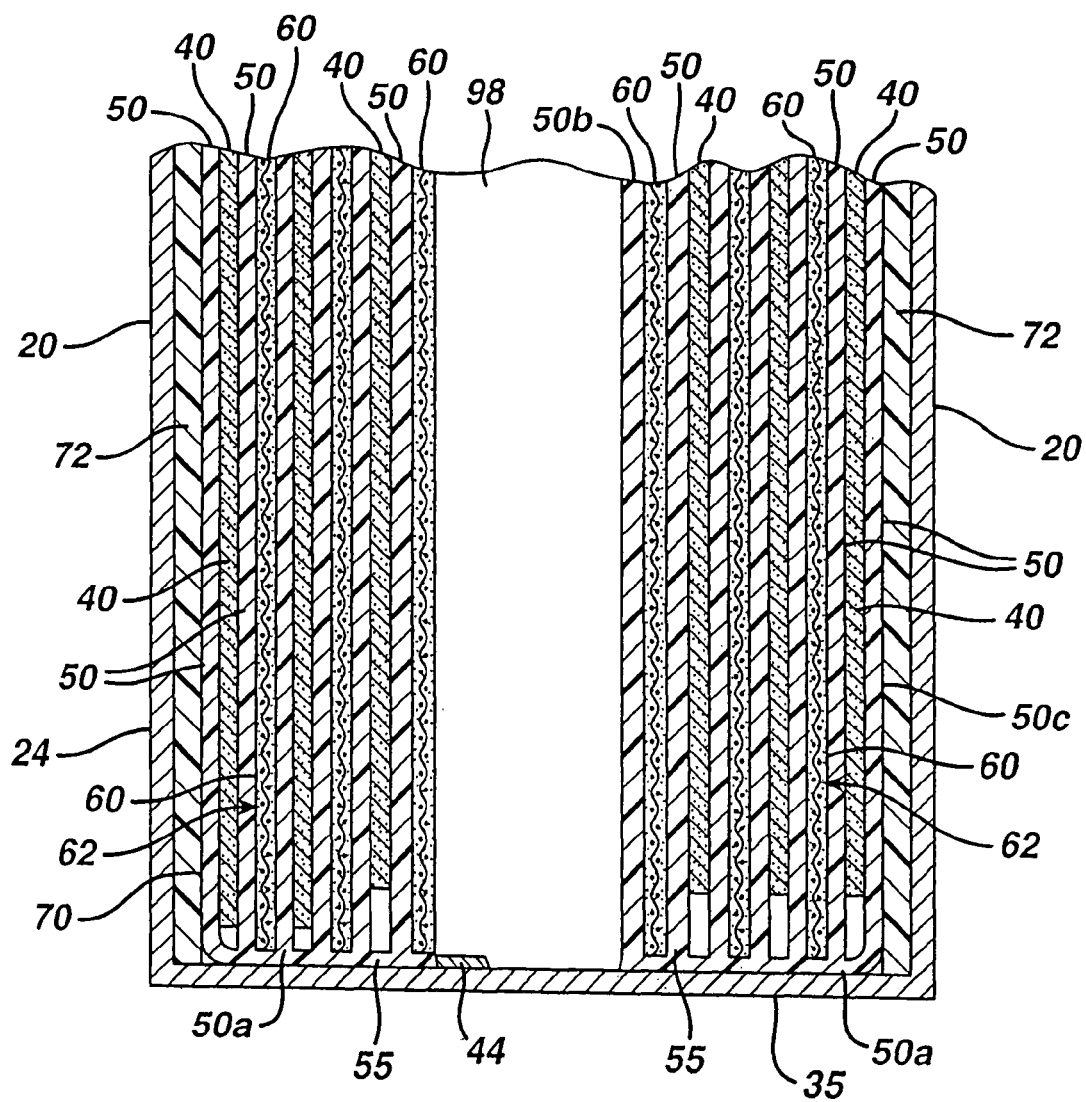
FIG. 3 is a partial cross sectional elevation view of the cell taken through sight lines 2-2 of FIG. 1 to show a spirally wound electrode assembly.
Figure 4:
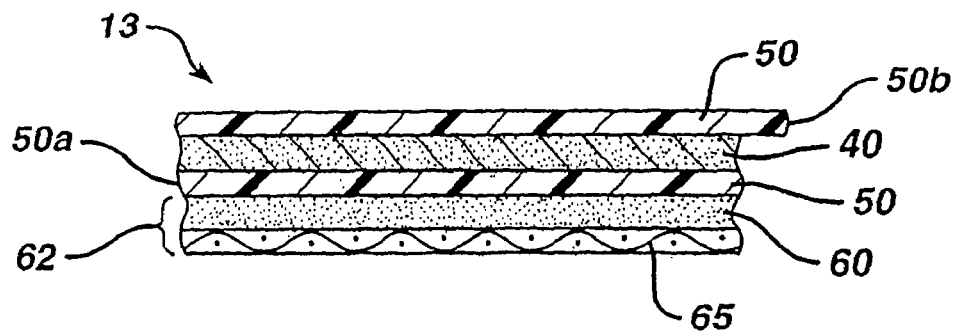
FIG. 4 is a schematic showing the placement of the layers comprising the electrode assembly.
Figure 5:
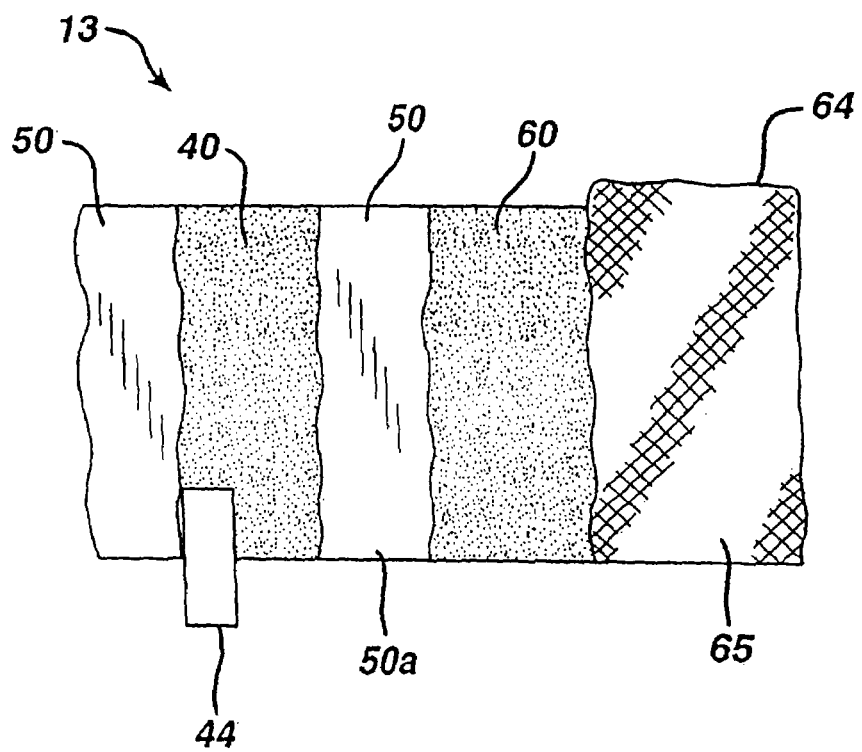
FIG. 5 is a plan view of the electrode assembly of FIG. 4 with each of the layers thereof partially peeled away to show the underlying layer.

For a spirally wound cell, a preferred shape of the cell casing (housing) 20 is cylindrical as shown in FIG. 1. Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide ($FeS_2$) coated onto metallic substrate 65 (FIG. 4).

The electrode composite 13 (FIGS. 4 and 5) can be made in the following manner: In accordance with the method of the invention the cathode 60 comprising iron disulfide ($FeS_2$) powder dispersed therein can be initially prepared in the form of a wet slurry which is coated onto a side of conductive substrate sheet 65, preferably a sheet of aluminum or stainless steel which may be a solid sheet with or without apertures therethrough, to form a cathode composite sheet 62 (FIG. 4). Conventional roll coating techniques may be used to coat the wet slurry onto a side of conductive substrate 65 (FIGS. 4 and 5). If an aluminum sheet 65 is used it may be a solid sheet of aluminum without openings therethrough or may be a sheet of expanded aluminum foil with openings therethrough thus forming a grid or screen.

The wet cathode slurry mixture having the composition shown above in Table 1 comprising iron disulfide ($FeS_2$), binder, conductive carbon and solvents is prepared by mixing the components shown in Table 1 until a homogeneous mixture is obtained.

The above quantities of components (Table 1) of course can be scaled proportionally so that small or large batches of cathode slurry can be prepared. The wet cathode slurry thus preferably has the following composition: $FeS_2$ powder (58.9 wt. %); Binder, Kraton G1651 (2 wt. %); Graphite, Timrex KS6 (4.0 wt %), Acetylene Black, Super P (1.5 wt %), Hydrocarbon Solvents, ShellSol A100 (13.4 wt %) and ShellSol OMS (20.2 wt %)

Applicants have tried to pretreat the $FeS_2$ powder by heating the powder in order to attempt reducing the amount of contaminants therein before the $FeS_2$ powder was used in forming the wet cathode slurry. It was found necessary to then place the treated $FeS_2$ in storage until ready for use in making the wet slurry as it is not practical in a commercial cell assembly operation to use the $FeS_2$ powder immediately after it has been pretreated. It has been discovered, however, that once the pretreated $FeS_2$ powder is thereafter stored or exposed to atmospheric conditions for even a short period prior to forming the wet slurry, much of the contaminants can reform in the powder. Such contaminants reform in the presence of moisture and oxygen in the atmosphere and result in components such as FeS, $H_2S$, $H_2SO_4$, $H_2SO_3$, $FeSO_4$, $FeSO_4.nH_2O$ (hydrate). The contaminants, if present in the cathode, can significantly interfere with proper performance of the $Li/FeS_2$ cell. Some of the contaminants, which are acids or Fe containing salts, can react directly with cell components, for example, the aluminum conductive substrate 65 on which the cathode is coated or may react directly with the lithium metal anode 40. The acids or salt contaminants may also promote polymerization of certain electrolyte solvents and also may promote dissolution of the iron in the FeS contaminant. Iron from contaminants such as FeS or $FeSO_4$ may gradually dissolve in the electrolyte or diffuse through the electrolyte medium and deposit onto the surface of the lithium anode. Any of these reactions involving the contaminants can interfere with cell capability and impede performance.

It is thus important to develop a treatment method for processing the $FeS_2$ powder and/or cathode coating 60 that prevents any significant reformation of the contaminants prior to insertion of the cathode in the cell and during cell usage. Applicants have developed a method of $FeS_2$ cathode preparation which eliminates the need to preheat the $FeS_2$ powder prior to forming the wet cathode slurry. Instead Applicants can prepare the wet cathode slurry, for example, according to the formulation as given in Table 1 without preheating the $FeS_2$ powder. The $FeS_2$ powder (Pyrox Red 325) may be used directly as obtained from the supplier, Chemetall GmbH. Such product may be obtained from the supplier with a $CaCO_3$ additive already mixed into the $FeS_2$ powder. The $CaCO_3$ may typically comprise up to 1.5 wt. % of the $FeS_2$ powder. The $CaCO_3$ (or $CaCO_3$ containing compound) is added by the supplier to raise the pH of the FeS2 in order to extend its storage life. That is, the elevated pH of $FeS_2$ resulting from the addition of $CaCO_3$ is intended to retard the rate of buildup of acidic contaminants within or on the surface of the $FeS_2$ particles as the $FeS_2$ is exposed to or stored in ambient air. As described in the Background section herein, the $CaCO_3$ additive has the disadvantage that it takes up volume within the cathode which could otherwise be used for additional $FeS_2$ powder. ($CaCO_3$ is an insulator and serves no electrochemical or conductive purpose. It takes up volume within the cathode which could otherwise be used for additional $FeS_2$ or other conductive material.)

Applicants have discovered that the storage life of the $FeS_2$ powder can be similarly extended without adding $CaCO_3$ or $CaCO_3$ containing compounds (or similar pH raising additives which act merely as insulators). Instead Applicants have discovered that the storage life of the $FeS_2$ powder can be extended by simply storing the $FeS_2$ powder in admixture with the same proportion of the carbon black, preferably acetylene carbon black, which is required for the cathode. That is, the carbon black, preferably acetylene black, at the same weight ratio to $FeS_2$ or same weight percent as needed in the cathode, is premixed into the $FeS_2$ powder. When the $FeS_2$ and carbon black mixture is stored in ambient air, the rate of buildup of acidic contaminants in the mixture is retarded and the storage life of the $FeS_2$ is thereby extended. The carbon black also does not promote agglomeration of the $FeS_2$ particles when the mixture of $FeS_2$ powder and carbon black is left in storage in ambient air. (The addition of $CaCO_3$ to $FeS_2$ powder is known to promote agglomeration of the $FeS_2$ particles when the mixture is left in storage in ambient air. Such agglomeration of the $FeS_2$ particles can cause difficulties in handling and processing and interfere with the discharge performance of the $Li/FeS_2$ cell.)

It will be appreciated that the rate of buildup of the acidic contaminants can also be further reduced by storing the $FeS_2$ and carbon black mixture in a sealed bag or container filled with air under partial vacuum pressure or filled with nitrogen or other inert gas such as argon, helium, neon, krypton, and mixtures thereof. The acetylene black, such as Super P acetylene black (Timcal Ltd) has an elevated pH of about 10 (ASTM D1512-95) as reported in the Timcal brochure. The elevated pH of the carbon black is a result of the thermal processing used in making carbon black from thermal decomposition or incomplete combustion of acetylene, natural gas or petroleum oil. The elevated pH of the carbon black such as acetylene black is thus not the result of additives. Rather, the elevated pH is the result of the degree of thermal processing of acetylene, natural gas or petroleum oil resulting in formation of residual surface groups and affecting the amount of the residual surface groups bonded to carbon at the surface of the acetylene black carbon particles. (See, Kim Kinoshita, Carbon—Electrochemical and Physiochemical Properties, John Wiley & Sons (1988), p. 93 to 105.)

It has been determined that the rate of buildup of acidic contaminants is retarded and the storage life of the $FeS_2$ is thereby extended, if the $FeS_2$ powder is stored in admixture with acetylene black instead of the $CaCO_3$ or $CaCO_3$ containing compounds. The acetylene black, however, unlike the $CaCO_3$ additive does not take up additional volume within the cathode, because the acetylene black is already needed for the cathode, namely, to provide a conductive network for the $FeS_2$ particles. The $FeS_2$ is premixed with the same weight ratio of acetylene black as needed for the cathode mixture so there is no waste of cathode volume which occurs if $CaCO_3$ is added into the $FeS_2$.

When it is desired to prepare the wet cathode slurry, the premix of $FeS_2$ powder and acetylene carbon black, is removed from storage and readied for admixture with binder and solvent solution. The mixture is stirred with graphite, binder and solvent as above described until a homogenous mixture is obtained, thus forming the wet cathode slurry.

After the wet cathode slurry is formed (Table 1), the wet slurry is then coated onto a side of the conductive substrate 65. The conductive substrate 65 with wet cathode slurry coated thereon is then dried in conventional convective oven as above indicated to evaporate the solvents in the slurry, thereby forming a dry cathode coating 60 on one side of conductive substrate 65 (FIGS. 4 and 5). The process is repeated, if desired, to also coat the opposite side of conductive substrate 65 with the wet cathode slurry (Table 1). The wet cathode slurry on the opposite side of conductive substrate 65 can then be subjected to drying in a convective oven to evaporate solvents, thereby forming a dry cathode coating 60 also on the opposite side of conductive substrate 65. The dry cathode coating 60 (whether applied to only one side or both sides of conductive substrate 65) is then subjected to calendering to compress the thickness of said dry cathode 60. At this point the dry cathode coating 60 on conductive substrate 65 is then subjected to the following step:

It has been determined that the dry cathode coating 60 on substrate 65 can be further subjected to baking in air under partial vacuum or in a nitrogen atmosphere (irrespective of pressure) at elevated temperature level between 250° C. and 375° C., preferably at a temperature between about 290° C. and 350° C., desirably at about 300° C. Tests by Applicants with Kraton G1651 polymeric binder reveal that the Kraton normally begins to loose its stability and rheological properties if heated in atmospheric air at a temperatures of about 250° C. Applicants, however, have determined that if such heat treatment of the dry cathode coating 60 on substrate 65 is done in air under partial vacuum or in nitrogen atmosphere (irrespective of pressure) the temperature stability of Kraton G1651 binder can be significantly extended to temperatures between about 250° C. and 375° C., preferably between about 290° C. and 350° C. and even up to a maximum of about 400° C. (Alternative heating atmosphere irrespective of pressure may be an inert atmosphere, such as argon, helium, neon, and krypton.)

Thus, it has been determined that if the dry cathode coating 60 on conductive substrate 65 is subjected to heating in air under partial vacuum or in nitrogen (or other inert atmosphere irrespective of pressure) the heating temperature (baking) can be extended to about 375° C. and even up to a maximum of about 400° C. without causing any significant deterioration in the rheological and physiochemical properties of the Kraton binder. In turn, it has been discovered that if the dry cathode coating 60 is subjected to such higher heating temperature (baking), the $FeS_2$ particles in the cathode can be purified of acids ($H_2S$, $H_2SO_4$ and $H_2SO_3$), and water therein to a very high degree. Moreover, if the heat treated (baked) cathode is then formed into an electrode spiral and inserted into the cell casing 20 and electrolyte added shortly thereafter, preferably in less than about 24 hours, since the time of the heat treatment (baking) of the cathode, the contaminants do not reform in any noticeable amount. That is, once the baked cathode is formed into a spiral and inserted in the cell casing 20 and electrolyte added, the cathode is not exposed to any moisture, since the electrolyte is moisture free. As a result there is no longer any environment present for the acidic contaminants to reproduce within or on the $FeS_2$ particles. Instead of inserting the cathode into the cell casing right after cathode baking or electrode assembly, the baked cathode 60 on substrate 65 or wound electrode assembly 70 can be stored for periods in sealed foil bags with nitrogen or other inert gas therein or in air under partial vacuum conditions prior to insertion into the cell casing. Alternatively, the wound electrode assembly 70 prior to or after insertion into the cell casing, may be stored in a dry room atmosphere having low relative humidity for a period up to about 24 hours. Electrolyte is then added to the cell covering the cathode with electrolyte as above indicated.

The cell containing cathodes prepared by the method of then invention have reduced contents of water and acidic contaminants and thus exhibits improved performance and stability.

Method of Preparation of $FeS_2$ Cathode According to the Method of the Invention A specific example of forming cathode 60 on substrate 65 employing the method of the invention is given as follows:

a) Obtain $FeS_2$ powder preferably without any pH raising additives therein and add carbon black, desirably acetylene black to the $FeS_2$ powder. A preferred acetylene black is Super P acetylene black from Timcal, which has a pH of 10. Optionally the $FeS_2$ powder may be heat treated to remove acidic components and water therein before the carbon black is added. For example, the $FeS_2$ powder may be heat treated in an atmosphere of nitrogen at a temperature of about 250° C. to 300° C. for a period of between about 360 and 1440 minutes to remove acids, water and other contaminants from the $FeS_2$ powder. The pretreated $FeS_2$ may be returned to storage in an inert atmosphere of nitrogen at room temperature (21° C.) for at least a few days before adding the carbon black. Alternatively, the $FeS_2$ powder may be obtained from the supplier at the request of Applicant with the acetylene black already premixed therein. The $FeS_2$ powder preferably does not have other pH raising additives, that is, other than the carbon black mixed therein. The heat treatment of FeS$_2$ immediately before adding the carbon black is optional and can be eliminated.

a.1) Prepare a mixture of said FeS$_2$ powder and carbon black, preferably acetylene carbon black such as acetylene black Super P from Timcal desirably in the same amount (weight percent) as intended for cathode coating 60 on substrate 65. Store the mixture of said FeS$_2$ powder and acetylene black in air at ambient temperature until desired to prepare a cathode slurry. Preferably, store the mixture of said FeS$_2$ powder and acetylene black in a sealed aluminum foil bag or container in an atmosphere of air under partial vacuum conditions or in an inert atmosphere of nitrogen, helium, argon, neon, or krypton, or mixtures thereof until ready for use in preparing the cathode slurry. The mixture comprising FeS$_2$ powder and carbon black, preferably acetylene black is stored as a dry mixture for a period of at least about 30 days. The storage of FeS$_2$ powder premixed with the carbon black, preferably acetylene black, serves to retard the rate of buildup of acidic contaminants on the FeS$_2$ particles.

a.2) Prepare a wet cathode slurry by adding graphite (Timrex KS6), and elastomeric binder Kraton G1651 dissolved in binder solvent to the mixture of FeS$_2$ powder and carbon black. (Alternatively, the graphite can be premixed into the FeS$_2$ powder at the time of adding the carbon black in the above step.) Mix the components in a planetary mixer until a homogeneous wet cathode slurry is obtained.

b) Coat the wet cathode slurry on one side of the conductive substrate 65, which may typically be sheet of aluminum or stainless steel.

c) Dry the wet cathode coating on substrate 65 in a convective oven (circulating hot air) to evaporate the solvents, thereby leaving a dry or substantially dry cathode coating 60 on substrate 65. The wet cathode slurry coated on the metal substrate 65 is dried in an oven preferably gradually adjusting or ramping up the temperature (to avoid cracking the coating) from an initial temperature of 40° C. to a final temperature not to exceed 130° C. for about ½ hour or until the solvent has substantially all evaporated. (At least about 95 percent by weight of the solvents are evaporated, preferably at least about 99.9 percent by weight of the solvents are evaporated.) This forms a dry or substantially dry cathode coating 60 comprising FeS$_2$, carbon particles, and binder on the metal substrate 65 and thus forms the cathode composite sheet 62 shown best in FIGS. 4 and 5. (The term "substantially dry coating" as used herein shall mean a coating that is a solid mass which is dry or moist to finger touch.)

d) Optionally, the opposite side of conductive substrate 65 may also be coated with the same wet slurry composition. In such case steps (a)-(c) are repeated.

e) Subject the conductive substrate 65 with dry cathode coating 60 thereon (cathode composite 62) to calendering to compress the thickness of the dry cathode coatings 60 on substrate 65.

f) Subject the conductive substrate 65 with dry cathode coating 60 thereon (cathode composite 62) to baking in a partial vacuum air atmosphere (pressure desirably less than 80 mm Hg absolute, preferably less than 50 mm Hg absolute). (Alternatively, the baking atmosphere, irrespective of pressure may be nitrogen, or inert gasses such as argon, neon, helium, or krypton.) The cathode coating 60 is subjected to baking at temperature desirably between about 250 and 375° C., preferably between about 290° C. and 350° C., for example at about 300° C. Cathode coating 60 on substrate 65 is subjected to baking at these temperature levels for a period typically between about 2 and 24 hours. Such baking may be extended for up to about 3 to 4 days. The baking of the cathode coating 60 at such elevated temperatures in the partial vacuum air atmosphere or in a nitrogen or inert gas atmosphere removes acids, water, and other contaminants from the FeS$_2$ particles.

g) After baking as in step (f) the cathode composite 62 (cathode coating 60 on substrate 65) is wound against a sheet of lithium anode 40 with separator 50 therebetween to form a wound electrode spiral assembly 70. A protective insulator film 72 may be applied around electrode spiral 70 and spiral 70 may then be inserted into casing 20. Electrolyte is added to the electrode spiral 70 in casing 20 as soon as possible, preferably within about 24 hours. The electrolyte contacts the anode and cathode material, thereby activating the cell. The presence of electrolyte also prevents air from penetrating into the anode or cathode material. As above indicated the baked cathode 60 on substrate 65 or wound electrode assembly 70 can be stored for periods in sealed foil bags with nitrogen or other inert gas therein or in atmosphere under partial vacuum conditions prior to insertion into the cell casing. Alternatively, the wound electrode assembly 70 prior to or after insertion into the cell casing, may be stored in a dry room atmosphere having low relative humidity for a period up to about 24 hours. Electrolyte is then added to the cell as soon as possible thereafter, to cover the cathode 60 therein.

For an AA size cell, the desired thickness of the final dry, calendered, cathode coating 60 is between about 0.172 and 0.188 mm, preferably about 0.176 mm. The dry cathode coating 60 resulting from the dry wet slurry (Table 1) thus may have the following desirable formulation: FeS$_2$ powder (89.0 wt. %); binder, Kraton G1651 elastomer (3.0 wt. %); acetylene black (2.0 wt. %) (Super P acetylene black from Timcal), graphite (6.0 wt. %) (Timrex KS6 graphite from Timcal). The acetylene black tends to absorb electrolyte and develops a carbon network which improves conductivity. Conductivity is further improved with the addition of graphite. The graphite if added may be natural, synthetic or expanded graphite and mixtures thereof. The dry cathode coating may typically comprise between about 85 and 95 wt. % iron disulfide (FeS$_2$); between about 4 and 10 wt. % conductive carbon; and the remainder of said dry coating comprising binder material. The conductive carbon in the dry cathode coating may comprise between about 4 and 10 wt. %, desirably between about 0.4 and 4 wt. % carbon black (preferably acetylene black), and between about 3.6 and 6 wt. % graphite. The carbon black is preferably acetylene carbon black and may have a BET surface typically between about 30 and 300 m$^2$/g, preferably between about 30 and 100 m$^2$/g. A preferred acetylene black (Super P acetylene black from Timcal) has an average particle size of about 40 nanometers and a bulk density of 0.160 g/cm$^3$.

The cathode substrate 65 can be a sheet of conductive metal foil, for example, a sheet of aluminum or stainless steel, with or without apertures therein. The cathode conductive substrate 65 is preferably a sheet of aluminum. The aluminum sheet 65 may have a plurality of small apertures therein, thus forming a grid or screen. Such aluminum sheet is available as EXMET aluminum expanded foil from Dexmet Company. Alternatively, cathode conductive substrate 65 may be formed of a sheet of stainless steel expanded metal foil having a basis weight of about 0.024 g/cm$^2$ forming a mesh or screen with openings therein. The cathode conductive substrate 65 secures the cathode coating 60 and functions as a cathode current collector during cell discharge.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum. In such case the alloy metal, is present in very small quantity, preferably less than 1 or 2 percent by weight of the lithium alloy. (However, the amount of aluminum in the lithium alloy may be as high as about 5 percent by weight of the lithium alloy.) Upon cell discharge the lithium in the alloy thus functions electrochemically as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm desirably between about 0.12 and 0.19 mm, preferably about 0.15 mm for the spirally wound cell.

Individual sheets of electrolyte permeable separator material 50, preferably of microporous polypropylene or polyethylene having a thickness of about 0.025 mm or less is inserted on each side of the lithium anode sheet 40 (FIGS. 4 and 5). The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
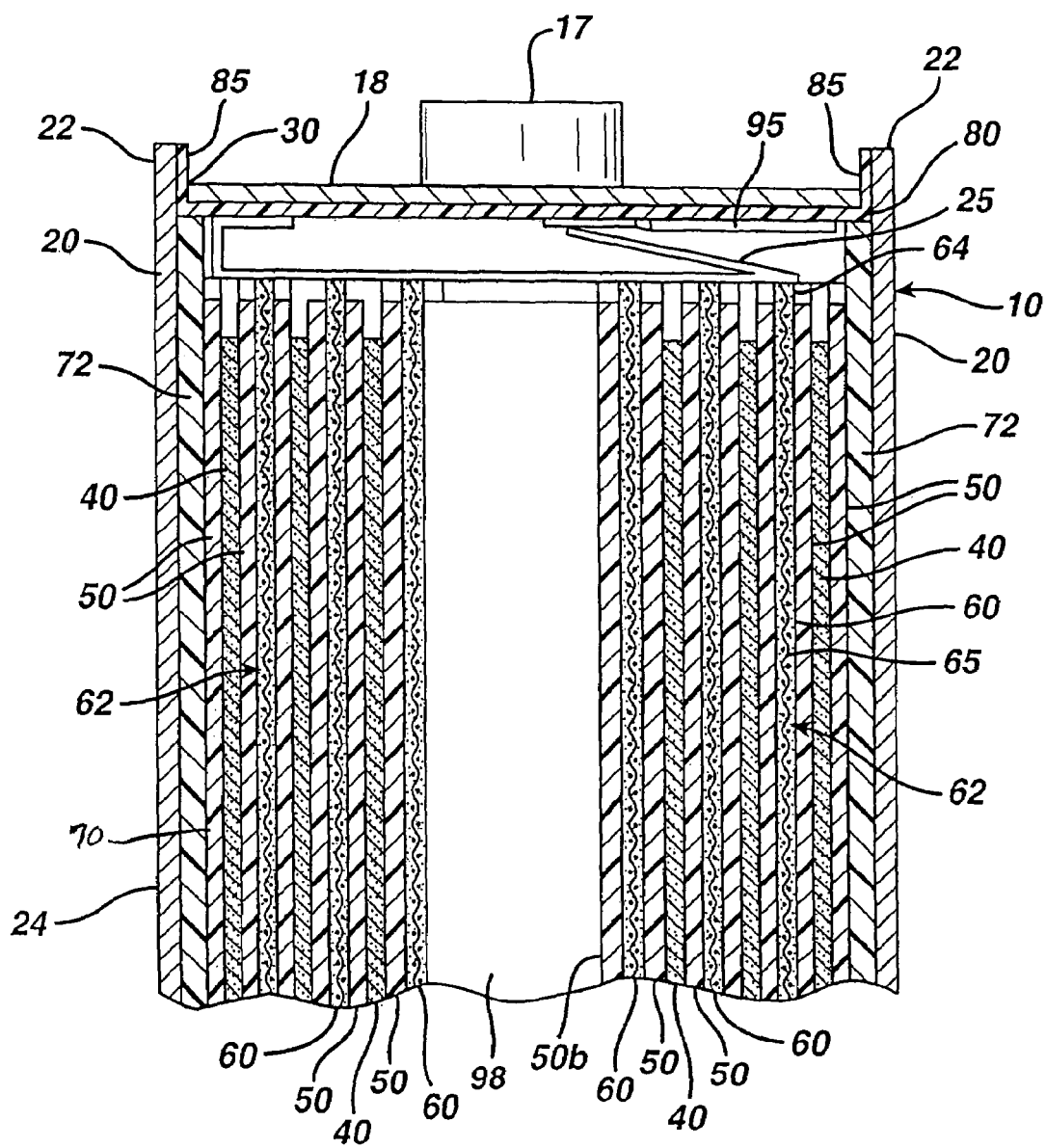
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polyester tape, can desirably be placed over a of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

A nonaqueous electrolyte mixture can then be added to the wound electrode spiral 70 after it is inserted into the cell casing 20. The desired nonaqueous electrolyte comprises a lithium salt $LiCF_3SO_3$ (LiTFS) or $Li(CF_3SO_2)_2N$ (LiTFSI) dissolved in an organic solvent. A desirable electrolyte solvent has been disclosed in commonly assigned application Ser. No. 11/516,534, filed Sep. 6, 2006. The desirable electrolyte solvent comprises methyl acetate (MA), propylene carbonate (PC), and ethylene carbonate (EC). Preferably the methyl acetate (MA) comprises between 5 and 95 vol. %, propylene carbonate (PC) comprises between 1 and 94 vol %, and ethylene carbonate (EC) comprises between 1 and 50 vol % of the electrolyte solvent mixture. Another desirable electrolyte is comprised of $Li(CF_3SO_2)_2N$ (LiTFSI) salt dissolved in a solvent mixture of 1,3 dioxolane (75 vol %) and sulfolane (25 vol %).

A suitable electrolyte has been determined to be an electrolyte solution comprising 0.8 molar (0.8 mol/liter) concentration of LiTFSI salt dissolved in an organic solvent mixture comprising about 75 vol. % methyl acetate (MA), 20 vol. % propylene carbonate (PC), and 5 vol. % ethylene carbonate (EC). Elemental iodine in the amount comprising about 0.5 wt % of the electrolyte is desirably added to the electrolyte. The electrolyte mixture is desirably added on the basis of about 0.4 gram electrolyte solution per gram $FeS_2$ for the spirally wound cell (FIG. 2).

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 may be flared along its top edge forming an extended portion 64 extending from the top of the wound spiral as shown in FIG. 2. The flared cathode substrate portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of close end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp, for a prolonged period, the resistance of the PTC device increases dramatically, thus shutting down the abnormally high drain. It will be appreciated that devices other than vent 19 and PTC device 95 may be employed to protect the cell from abusive use or discharge.

Comparison Test Showing Increase in pH of $FeS_2$ Powder Upon Storage With Acetylene Black Powder Mixed Therein Sample A: FeS2 Powder (Pure—Without any pH Raising Additive Mixed Therein)

$FeS_2$ powder (Pyrox Red 325 powder from Chemetall GmbH) was obtained without any pH raising additive mixed therein. The FeS₂ powder was not heat treated after it was obtained from the supplier and no pH raising additives or other additives were added to the FeS₂ powder. The FeS₂ had an average particle size of between about 20 and 26 micron and typical BET specific surface of 1.1 m²/g and a density of 4.7 g/cm³. The FeS₂ powder was placed in an aluminum storage bag with air squeezed out as much as possible. The bag was sealed and placed in storage at room temperature (22° C.) and under atmospheric conditions.

Sample B: FeS2 Powder—(with Acetylene Black Mixed Therein)

FeS₂ powder (from supplier Chemetall GmbH) was obtained without any pH raising additive mixed therein. The FeS₂ powder was then heat treated at 300° C. for 12 hours in an atmosphere of nitrogen. The heat treatment removed moisture, and acidic contaminants such as H₂S, H₂SO₃, and H₂SO₄. The FeS₂ had an average particle size between about 20 and 26 micron and typical BET specific surface of 1.1 m²/g and a density of 4.7 g/cm³. The FeS₂ powder was then mixed with Super P acetylene black and TIMREX KS6 graphite, both from Timcal-America. The mixture comprised FeS₂ (91.4 wt. %), acetylene black (1.1 wt. %) and graphite (7.5 wt. %). This is a desired blend for use as cathode material in a Li/FeS₂ cell (binder material such as Kraton G1651 is later added as above described to form the cathode slurry). The mixture had an average particle size of 14.8 micron and an average BET specific surface of 2.57 m²/g. The mixture was poured into a polypropylene plastic bottle with 5 mm particle size ZrO grinding media added to assure good mixing. The bottle was then closed and placed in a Turbula T2C mixer and the mixture of FeS₂ powder, acetylene black, and graphite therein was mixed for 2 hours. The grinding media was removed from the mixture using a strainer and the mixture then placed in an aluminum foil bag. The bag was squeezed to remove as much air as possible and then the bag was then heat sealed. The bag containing the FeS₂, acetylene black, and graphite mixture was then stored at room temperature.

Test Results:

After 2 months of storage the pH of the above Samples A and B was determined. The pH of the samples was determined using International Standard Method ISO 787/9-1981 (E) (similar to ASTM D1512 method). After the two month storage period Sample B which contained acetylene black mixed into the FeS₂ powder had a higher pH of 4.5 compared to the pH of 3.4 for Sample A, which had FeS₂ powder without acetylene black. That is, from the start to the end of the 2 month storage period Sample A became more acidic. The pH of Sample A decreased to 3.4 (more acidic pH) whereas the pH of the Test Sample B did not show any increase in acidity. In fact the pH of Test Sample B (FeS₂ powder with acetylene black) appeared to increase to a higher pH of 4.5. That is, during the storage period the acetylene black additive to the FeS₂ powder protected the FeS₂ in Sample B better from formation of acidic contaminants compared to the FeS₂ powder without the acetylene black additive.

Although the invention has been described with reference to specific embodiments, it should be appreciated that other embodiments are possible without departing from the concept of the invention and are thus within the claims and equivalents thereof.

What is claimed is:

1. A method of storing iron disulfide (FeS2) powder to reduce the rate of buildup of acids and acidic contaminants on the powder particles being stored, wherein the method includes steps of (a) forming a powder mixture comprising iron disulfide powder particles and carbon black and (b) storing said powder mixture for a period of at least 30 days, wherein the method is performed prior to forming a cathode slurry.

2. The method of claim 1 wherein the carbon black has a pH of between about 6 and 11.

3. The method of claim 2 wherein the carbon black comprises acetylene black.

4. The method of claim 1 wherein said powder mixture is substantially dry.

5. The method of claim 1 wherein said powder mixture is stored in an atmosphere, wherein said atmosphere is selected from nitrogen, argon, neon, helium, krypton, and air under partial vacuum pressure.

6. A method of preparing a cathode for a primary electrochemical cell wherein said cathode comprises iron disulfide (FeS2) particles, the method comprising the steps of:
   i) preparing a powder mixture comprising iron disulfide (FeS2) powder particles and carbon black powder particles;
   ii) storing said powder mixture for a period of at least about 30 days prior to forming a cathode slurry, thereby reducing the rate of buildup of acids and acidic contaminants on the powder particles while said particles are stored;
   iii) preparing a wet cathode slurry mixture by adding a mixture of polymeric binder and liquid solvent to said mixture of iron disulfide (FeS2) and carbon black particles;
   iv) coating said slurry mixture onto at least one side of a substrate; and
   v) drying said slurry mixture to evaporate said solvent forming a substantially dry coating comprising the iron disulfide particles, carbon black particles, and polymeric binder on said substrate.

7. The method of claim 6 wherein the carbon black comprises acetylene black.

8. The method of claim 6 wherein the carbon black has a pH of between about 6 and 11.

9. The method of claim 6 wherein the carbon black comprises between about 0.4 and 2 percent by weight of said dry coating.

10. The method of claim 6 wherein said powder mixture is substantially dry.

11. The method of claim 6 wherein said wet slurry further comprises graphite.

12. The method of claim 6 wherein said powder mixture is stored in an atmosphere, wherein said atmosphere is selected from nitrogen, argon, neon, helium, krypton, and air under partial vacuum pressure.

13. The method of claim 6 further comprising the step of:
   baking said substantially dry coating in an atmosphere, wherein said atmosphere is selected from nitrogen, argon, neon, helium, krypton, and air under partial vacuum pressure, to remove water, acids and contaminants present in the iron disulfide particles and in said coating, and to form thereby a baked cathode coating on said substrate.

14. The method of claim 13 wherein said air atmosphere has a pressure of less than about 80 mm Hg absolute.

15. The method of claim 13 wherein said air atmosphere has a pressure of less than about 50 mm Hg absolute.

16. The method of claim 13 wherein at least a substantial portion of said baking occurs at temperatures between about 250° C. and 375° C.

17. The method of claim 13 wherein at least a substantial portion of said baking occurs at temperatures between about 290° C. and 350° C.

18. The method of claim 6 wherein said binder comprises an elastomeric polymer.

19. The method of claim 6 wherein said binder comprises a styrene-ethylene/butylene-styrene (SEBS) block copolymer.

20. The method of claim 6 wherein said substrate is electrically conductive.

21. The method of claim 6 wherein said substrate comprises aluminum or stainless steel.

22. The method of claim 13 further comprising the steps of:
   winding said baked cathode on said substrate against a sheet of lithium or lithium alloy, with a separator sheet therebetween to form a wound electrode spiral;
   inserting said wound electrode spiral into a cylindrical casing; and
   adding electrolyte into said casing, thereby contacting said baked cathode with electrolyte.

23. The method of claim 13 wherein said baking is carried out for a period between about 2 hours and 4 days.

24. The method of claim 22 further comprising the step of storing the baked cathode in a partial vacuum atmosphere or in an inert atmosphere before contacting said baked cathode with electrolyte.

25. The method of claim 8 wherein the addition of carbon black to said FeS2 particles in admixture therewith reduces or eliminates the need to add any non-electrically conductive material in admixture with said FeS2 particles in order to raise the pH of said FeS2.

26. The method of claim 1 wherein said powder mixture is stored in air at ambient temperature.

* * * * *